United States Patent [19]

Bege et al.

[11] 4,311,531
[45] Jan. 19, 1982

[54] METHOD FOR CLEANING MIXING DEVICES

[75] Inventors: Dietmar Bege, Erlangen; Anwer Puthawala, Erlangen-Buckenhof, both of Fed. Rep. of Germany

[73] Assignee: Kraftwerk Union AG, Mülheim, Fed. Rep. of Germany

[21] Appl. No.: 128,274

[22] Filed: Mar. 7, 1980

[30] Foreign Application Priority Data

Mar. 19, 1979 [DE] Fed. Rep. of Germany ....... 2910708

[51] Int. Cl.³ ..................... B08B 3/08; B08B 7/04; B08B 9/00
[52] U.S. Cl. .......................... 134/10; 134/22 R; 134/26; 134/40; 252/633
[58] Field of Search ............ 134/10, 22 R, 26, 40; 252/301.1 W

[56] References Cited

U.S. PATENT DOCUMENTS

| | | | |
|---|---|---|---|
| 2,356,254 | 8/1944 | Lehmann et al. | 134/40 X |
| 2,937,112 | 5/1960 | Boyer | 134/40 |
| 3,436,263 | 4/1969 | Strenkert et al. | 134/40 X |
| 3,536,529 | 10/1970 | Fiocco | 134/40 |
| 3,971,732 | 7/1976 | Meier | 252/301.1 W X |
| 4,108,681 | 8/1978 | Lawson et al. | 134/40 X |

FOREIGN PATENT DOCUMENTS 2631326  1/1978  Fed. Rep. of Germany ... 252/301.1 W

*Primary Examiner*—Marc L. Caroff
*Attorney, Agent, or Firm*—Herbert L. Lerner; Laurence A. Greenberg

[57] ABSTRACT

Mixing devices such as worm machines used for embedding radioactive wastes in hot bitumen are cleaned to remove residual bitumen and salt incrustations in three successive operations: (a) Washing with a solvent for bitumen in a volume amount equal to about the free space of the device. (b) Rinsing with a water-soluble rinsing medium miscible with the solvent in a volume amount the same as (a). (c) Rinsing with demineralized water in a volume amount twice (b). Pumice gravel is used to absorb the solvent and rinsing medium and the resultant pumice embedded in bitumen and sent to ultimate storage.

10 Claims, 1 Drawing Figure

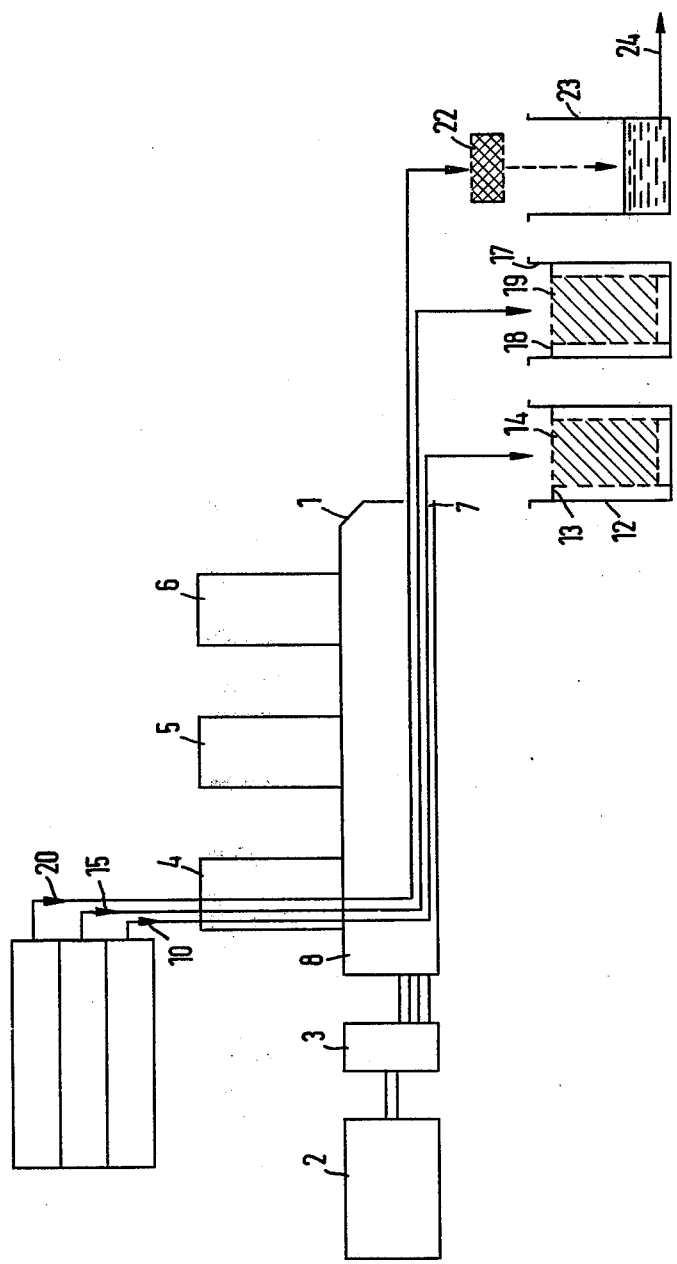

METHOD FOR CLEANING MIXING DEVICES

BACKGROUND OF THE INVENTION:

The invention relates to a method for cleaning mixing devices for embedding radioactive wastes in hot bitumen, especially heated worm machines, with an exhaust steam line and a discharge opening.

DESCRIPTION OF THE PRIOR ART

After the mixing device is shut down, bitumen residue remains in the mixer. Also salt incrustation and sometimes foreign objects are found in the mixer. These unwanted deposits must be removed because they are prone to block the movable parts of the mixer and at the least, interfere with the inspection of the mixing device.

SUMMARY OF THE INVENTION

With the foregoing and other objects in view, there is provided in accordance with the invention a method for cleaning mixing devices such as heated worm machines with an exhaust steam line and a discharge opening, used for embedding radioactive wastes in hot bitumen, to remove residual bitumen and salt incrustations which comprises cleaning the interior of the mixing device by the following steps:

(a) washing the interior of the mixing device with a solvent medium in which bitumen is soluble in a volume amount of solvent medium at least equal to the volumetric capacity of the mixing device.

(b) Rinsing the interior of the mixing device with a water-soluble rinsing medium which is miscible with said solvent medium in a volume amount approximately the same as the solvent medium.

(c) Rinsing the interior of the mixing device with demineralized water in a volume amount approximately twice the water-soluble rinsing medium.

Other features which are considered as characteristic for the invention are set forth in the appended claims.

Although the invention is illustrated and described herein as embodied in a method for cleaning mixing devices, it is nevertheless not intended to be limited to the details shown, since various modifications may be made therein without departing from the spirit of the invention and within the scope and range of equivalents of the claims.

BRIEF DESCRIPTION OF THE DRAWING

The invention, however, together with additional objects and advantages thereof will be best understood from the following description when read in connection with the accompanying drawing which diagrammatically illustrates a worm drier to be cleaned, three separate washing and rinsing mediums with connecting lines to the worm drier, and three separate containers with two containers having inserts filled with pumice gravel for receiving the washing and rinsing mediums after discharge from the worm drier.

DETAILED DESCRIPTION OF THE INVENTION

The mixing device is first washed from the exhaust steam line to the discharge opening, with a solvent for bitumen in volume amount which is at least as large as the volume of the mixer. The mixing device is then rinsed with approximately the same volume amount of a water-soluble rinsing medium that is miscible with the solvent. The mixing device is then rinsed with about twice the volume amount of chemically neutral water (deionate).

The individual cleaning operations should follow each other without long interruptions so that if a residue of the solvent for bitumen remains in the mixer, the solvent for bitumen is rinsed out of the mixer by the water-soluble rinsing medium. Likewise, the water-soluble rinsing medium is washed out with chemically neutral water, so that the mixer is not only free of bitumen or incrustations but that also solution and rinsing medium residue is no longer present.

Preferably, a solvent for bitumen is used which has a flash point of 150 to 250° C. Suitable solvents are, for example, multi-ring cyclic hydrocarbons, preferably mixtures of such hydrocarbons which are sold industrially as a petroleum fraction. A solvent which has been found suitable is commercially available in Germany from the Shell Company under the trade name "Somil 80".

It has been found that butyl diglycol can be used to advantage as a rinsing medium miscible with organic solvents and water. This rinsing medium can be mixed with water in any proportion, i.e. it is completely miscible with water. Consequently the butyl diglycol is completely removed in the subsequent rinse with chemically neutral water.

The solvent for bitumen and the water-soluble rinsing medium can advantageously be bound to solid sorbents, for instance, pumice gravel. Pumice gravel is understood to be a pumice granulate which, with a particle size of about 4 to 15 mm diameter, has a specific bulk gravity of 250 to 300 g/l. The pumice gravel is porous and binds or holds the washing and the rinsing mediums discharged into the pumice gravel. Solvent medium and rinsing medium can advantageously each be introduced into a separate body of pumice gravel and thereby be bound separately to a separate body of pumice gravel in order to make separate removal possible. In any event, the pumice gravel can be embedded in known manner in bitumen and then taken to ultimate storage. Each body of pumice gravel is desirably placed in an insert which in turn is inserted into a barrel. A space can be provided between the pumice gravel and the walls of the barrel. The space reduces the radiation of the activated solvent and rinsing media through the barrel, so that is does not exceed the permissible level on the outside of the barrel.

The neutral water used for the final rinse can be filtered via an oil binding agent such as pumice gravel such as "Raab-W 75", sold by Raab, Neuwied, Germany, to remove traces of oil that may be carried by the water. This oil binding agent in turn can then be mixed-in with bitumen and stored. The filtered water, on the other hand, can be put in a container from which it is removed together with other wastes to be embedded in an existing installation. In this manner very little additional expense is required to dispose of the active filtered water.

To explain the invention in greater detail, an embodiment example will be described, making reference to the attached drawing.

The drawing shows schematically a worm drier 1 which is of known design, for example, as described in U.S. Pat. No. 3,971,732. The worm drier is set in motion by an electric motor 2 via a transmission 3. The worm drier has three steam domes 4, 5 and 6 with exhaust-steam lines, not shown, and a discharge opening 7. At the end 8 facing away from the discharge opening 7, the radio-active wastes to be embedded, for instance, evaporator concentrates from the waste water purification system of a pressurized-water reactor, and the bitumen used as the embedding material, are brought in.

After the embedding process or in the event of a disturbance, the worm drier 1 is cleaned in three successive steps. To this end, the discharge opening 7 is first closed. Then, the "Somil 80" already mentioned as the solvent for the bitumen is introduced first into the cooled-down and shut-down worm drier, as indicated by the arrow 10. The amount of "Somil" is 20 l which corresponds approximately to the free space or volumetric capacity in the worm drier 1. After a retention time of 12 to 24 hours, the "Somil" is drained off. It runs through the worm drier 1 in the direction toward the discharge opening 7. Behind the latter, it is collected in a barrel 12, which contains an insert 13 with a pumice gravel charge 14.

In a second rinsing operation, which is indicated by an arrow 15, the worm drier 1 is subsequently rinsed also with 20 l butyl diglycol and specifically, again from the steam dome 4 toward the discharge opening 7. A retention time of two hours is sufficient here. The butyl diglycol is then collected in a barrel 17 which likewise contains pumice gravel 19 in an insert 18. "Somil" which may still be present in the worm drier, is rinsed out with the butyl diglycol.

Finally, the worm drier 1 is rinsed in a third rinsing operation, as indicated by the arrow 20, with twice 20 l of deionate and with a very short retention time. Deionate is chemically neutral (ionfree) water which is conducted at the discharge opening 7 through an oil binder 22 before it is collected in a barrel 23, from which it is passed on, as indicated by the arrow 24, to a container from which the wastes are drawn in known manner to be embedded in a binder. Thereupon a rinse with further deionate or demineralized water with continuous flow is performed in order to wash out remaining salts. This deionate can be taken directly to the waste water purification system.

The new method has proven to be highly practical. It performs excellent cleaning of the worm driers employed as mixing devices, and the cleaning agents used can be removed in a simple manner. The solvent and rinsing media used are not, as otherwise customary, transported off in liquid form but are solidified and become capable of ultimate storage by filling the barrels 12 with the pumice gravel charge, which has absorbed the solvents and the cleaning media, with bitumen in the same installation. Another solification medium, for instance, concrete slurry, can also be used instead of bitumen.

There are claimed:

1. Method for cleaning mixing devices having an exhaust steam line and a discharge opening, used for embedding radioactive wastes in hot bitumen, to remove residual bitumen and salt incrustations, which comprises cleaning the interior of the mixing device by the following successive steps:
    (a) washing the interior of the mixing device with a volume amount of an organic solvent in which bitumen is soluble, said amount of solvent being at least equal to the volumetric capacity of the mixing device, and then discharging the solvent from said mixing device;
    (b) rinsing the interior of the mixing device with a volume amount of a water-soluble rinsing liquid completely miscible with water and which is also miscible with said solvent, said amount of rinsing liquid being approximately the same as said amount of solvent, and then discharging the rinsing liquid from said mixing device; and
    (c) rinsing the interior of the mixing device with a volume amount of demineralized water approximately twice said amount of water-soluble rinsing liquid and discharging the demineralized water from said mixing device.

2. Method according to claim 1, wherein said solvent contains cyclic hydrocarbons having more than 1 ring.

3. Method according to claim 1, wherein said water-soluble rinsing liquid is butyl diglycol.

4. Method according to claim 1, wherein the solvent after said washing and the water-soluble rinsing liquid after said rinsing are discharged from said mixing device and passed into and held by a body of pumice gravel.

5. Method according to claim 1, wherein the solvent after said washing is discharged from said mixing device and passed into and held by a separate body of pumice gravel.

6. Method according to claim 1, wherein the water-soluble rinsing liquid after said rinsing is discharged from said mixing device and passed into and held by a separate body of pumice gravel.

7. Method according to claim 4 or claim 5 or claim 6, wherein the pumice grave containing said discharge from said mixing device is embedded in bitumen and is then moved to a site for ultimate storage.

8. Method according to claim 4 or claim 5 or claim 6 wherein the body of pumice gravel is disposed in an insert for a barrel, with spacing between the body of pumice gravel and the wall of the barrel.

9. Method according to claim 1, wherein the demineralized water is filtered to remove oil contained therein.

10. Method according to claim 9, wherein the filtered water is collected in a container from which the wastes are drawn to be embedded in a binder.

* * * * *